United States Patent [19]

Kanzaki

[11] Patent Number: 4,861,621
[45] Date of Patent: Aug. 29, 1989

[54] PULTRUSION WITH CURE BY ULTRAVIOLET RADIATION

[75] Inventor: Takashi Kanzaki, Sennan, Japan
[73] Assignee: Toyo Boseki Kabushiki Kaisha, Osaka, Japan
[21] Appl. No.: 184,559
[22] Filed: Apr. 21, 1988
[30] Foreign Application Priority Data
Apr. 27, 1987 [JP] Japan ................. 62-104999
[51] Int. Cl.⁴ ............... B05D 3/06; B05C 11/02
[52] U.S. Cl. ..................... 427/54.1; 118/125; 118/620; 264/1.4; 264/22; 427/358
[58] Field of Search ......... 427/54.1, 358; 264/1.4, 264/22; 118/620, 125

[56] References Cited

U.S. PATENT DOCUMENTS

| | | | |
|---|---|---|---|
| 4,264,661 | 4/1981 | Brandolf | 264/22 |
| 4,364,879 | 12/1982 | Gut et al. | 264/22 |
| 4,474,830 | 10/1984 | Taylor | 427/54.1 |
| 4,636,405 | 1/1987 | Mensan | 427/54.1 |
| 4,656,049 | 4/1987 | Noto | 427/54.1 |
| 4,662,307 | 5/1987 | Amos | 427/54.1 |
| 4,738,868 | 4/1988 | Fischer et al. | 427/54.1 |
| 4,770,898 | 9/1988 | Sugai et al. | 427/54.1 |

Primary Examiner—Janyce Bell
Attorney, Agent, or Firm—Armstrong, Nikaido Marmelstein, Kubovcik & Murray

[57] ABSTRACT

Pultrusion with cure by ultraviolet (UV) radiation, for manufacturing FRP wherein a continuous reinforcing material, most commonly, glass roving is first impregnated with a curable liquid resin and pulled through a UV transmittent die having a desired cross section and a sufficient length to effect the cure and, during passage through such a die, the continuous resinous material or FRP material is subjected to exposure to UV radiation to complete the pultrusion. The invention lies in prevention of sticking trend of the uncured resinous material onto the internal wall of the die. The present invention eliminates the sticking trend by a coating on the internal wall of the glass die. Another embodiment of the pultrusion uses a pipe die having a short length which is insufficient to allow completion of the cure reactions, and then, after passing through such a die, the FRP material to be cured is introduced into a medium liquid of UV transmittent type pressure and therein the material is exposed to UV radiation.

24 Claims, 2 Drawing Sheets

PULTRUSION WITH CURE BY ULTRAVIOLET RADIATION

FIELD OF THE INVENTION

This invention relates to production of fiber reinforced plastics, which will be noted FRP. In particular, this invention relates to shaping of FRP by the art of pultrusion.

BACKGROUND OF THE INVENTION

The term "pultrusion" is generally used to mean the art for manufacturing FRP wherein a continuous reinforcing material, most commonly, a filamentary material, is first impregnated with a curable or polymerizable liquid resin and pulled through a die having a desired cross section to shape the impregnated resinous material with polymerization cure into a cured product having a continuous length having a uniform cross section which has been molded by the die.

In pultrusion, because any polymerizable or curable liquid resin may be utilized, polymerization or cure by radiation of ultraviolet ray, which will be noted UV, has conventionally been studied. However, a difficulty involved in a curing process by UV radiation lay in strong sticking trend of uncured or half-cured liquid resin onto the die inside surfaces, with which the resin is in contact during the process from initial liquid stage to cured solid stage. Specifically, a commonly applied die was a pipe made of glass, which is not absorptive of UV and, through the glass wall externally, UV was radiated at internally travelling target things to be cured. In such a process, a sticking or adhering trend of the resin onto the internal face of the glass pipe was inevitable which demands more powerful pull force and, even if such an operation were maintained with overcoming force, it was not possible to avoid occurrence of deposit or layering of polymerized resin thereon with time, which would impede exact regeneration products of an applied die section shape, thus commonly rendering thinner or deformed cross sections.

SUMMARY OF THE INVENTION

This invention is intended to provide pultrusions with cure by UV radiation free of such conventional difficulty as noted above. And the intended pultrusion process is accomplished in this invention by the following method.

Firstly, the glass die, which is meant for a die having a length sufficient to effect the cure, is improved by an internal coating or composition with a UV transmissive material having more repulsion or rejection to the sticking trend, for instance, with a silicone or fluorine compound. Alternatively, the pipe die is made of a UV transmittent plastic, for instance, polyethylene or polypropylene and thereon internally coated with a silicone or fluorine compound as noted above. Otherwise, the pipe die itself is made of such a material as more repulsive to the sticking, for instance, an appropriate silicone or fluorine resin.

Secondly, apart from employing a pipe die having a suitable length sufficient to complete the whole cure reactions therein, the impregnated material or FRP material is pulled into a die having a short length insufficient to complete the cure, but sufficient to effect impressing or shaping of the impregnant material at substantially uncured stage and just subsequently, the uncured continuous material is introduced into a UV transmittent, medium liquid which is substantially immiscible with the resin being cured, and therein the impregnated material is exposed to UV radiation.

The UV transmittent, medium liquid comprises, for instance, water silicone oils. And in the second art, the die may be made of a metal, for instance, stainless steel which is not transmittent of UV, or of the improved glass or plastic pipe as mentioned in the first art. Further, the die may be modified to be a connection of a stainless pipe at a base portion extended forwardly with the improved glass or plastic pipe as mentioned in the first art. This modified version of the die design is effective when very initial stage of the whole cure is planned to occur during passage in the die and such a device is desirable in lateral or horizontal pull as will be described and illustrated hereinlater.

Said curable a liquid resin, when it is in the form of liquid mass, called coating material, may be unsaturated polyester, which is most commonly produced by reacting maleic and/or fumaric acid with propylene glycol followed by thinning with styrene, or unsaturated acrylate, for instance, ester acrylate, epoxy acrylate, urthane acrylate.

A UV sensitizer, which will be incorporated in a coating material, may be chosen from a conventional group known to be effective in UV cure.

Said reinforcing filamentary material may be glass fiber or other inorganic fibers; for instance, boron fiber, otherwise, organic fibers; for instance, nylon, polyester, polyethylene, polypropylene so far as they are substantially transmittent of UV. However, carbon fiber which is commonly manufactured by carbonization of acrylic fiber is excepted, because of UV absorptive property.

Example of said silicone and fluorine resin may be any of those known as silicone resin or silicone rubber; fluorine resin or fluorine rubber.

Glass may be any kind of glass which the term "glass" customarily includes, for instance, quartz.

BRIEF DESCRIPTION

FIG. 1 schematicaly shows a lateral pultrusion with use of a pipe die having a sufficient length to complete a cure attempted.

FIG. 2 smilarly shows a vertical or upward pultrusion with passage through a medium liquid.

FIG. 3 similarly shows a lateral pultrusion with passage through a medium liquid.

As will be understood, the embodiment of FIG. 1 belongs to the first art (or embodiment) and those of FIGS. 2 and 3 belong to the second art (or embodiment) in terms noted in the foregoing paragraphs.

FIG. 4 schematically shows a longitudinal section of a tip portion of a die or mandrel which is provided with skin/core double ports, wherein such two ports will be often used to make FRP by the core port and to form non FRP annular coverage, or skin or cladding, by the skin port.

These drawings are given by way of illustrating the inventive embodiments and therefore these should not be construed to limit the present invention.

DESCRIPTION OF EMBODIMENTS

Embodiments will be first explained with reference to the drawings, wherein a like numeral indicates a like part through these drawings. 1 is a reinforcing filamentary material in the form of roving or tow or the like, which is converted to be impregnated form as noted above, wherewith an arrow line indicates a travelling direction. 2 is a coating material or mass of a curable liquid resin. 3 is a unit for UV radiation, wherein arrow lines symbolize radiation. 4 is a pipe die, which may be of circular section, otherwise, it may be of non circular section to manufacture some profiled product, for instance, T-shaped section or canal section. 5 is a UV lamp. 6 is a medium liquid.

Further, 1a is a guide roller, 2a is a coating material tank, 4a is an exit nozzle, 6a is a medium liquid tank.

Figure 4:
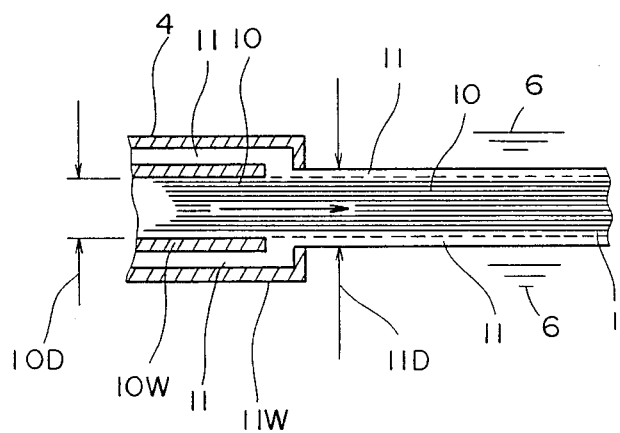

In FIG. 4, 10 is a core stream, 10D is the diameter thereof, 10W is a die wall therefor, and 11 is a skin stream, 11D is the diameter thereof, 11W is a die wall therefor.

Figure 1:
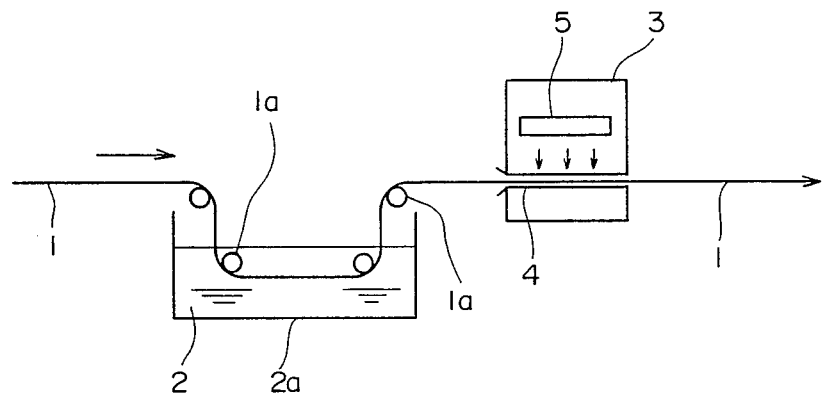

In the case of the FIG. 1 embodiment, the die should be a kind of the improved ones as noted before and a medium liquid is not involved. In the case of the FIG. 2 embodiment, the die may be short in length and may be made of a UV absorptive material, for instance, stainless steel.

Figure 3:
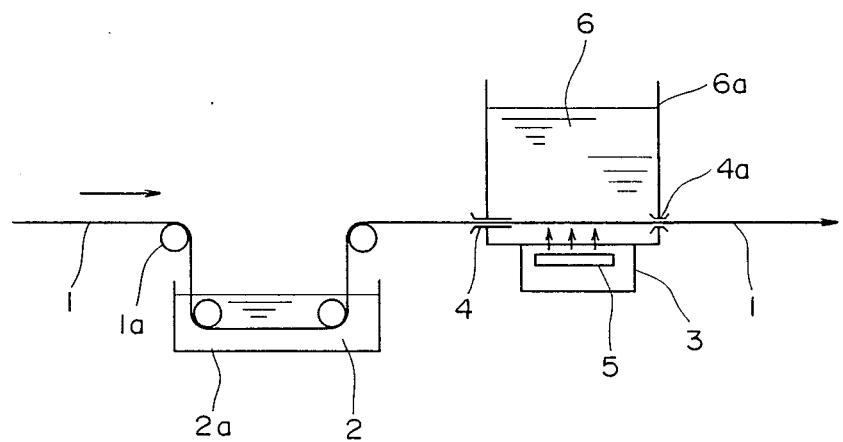

In the case of the FIG. 3 embodiment, the die may be a modified one as noted before.

Figure 2:
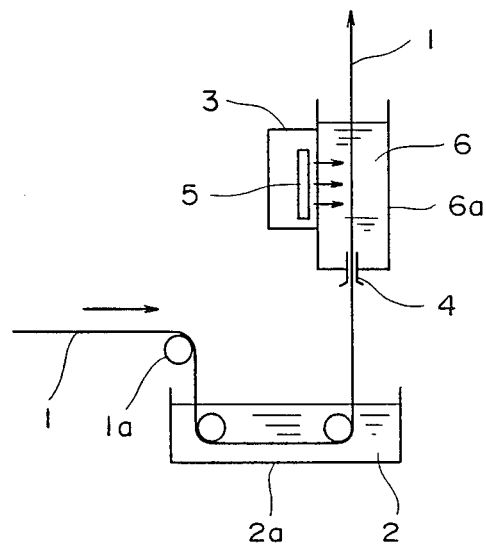

Making reference to FIGS. 2 and 3, these two cases employ a medium liquid, on which account the upward pull (FIG. 2) requires a liquid seal construction with the entry die 4 which is mounted at the bottom of the unit 3. At a point where the continuous resinous material or FRP material is pulled out of the die tip, the material is still at substantially uncured or nearly liquid state, whereat it receives static liquid pressure, proportional to the depth of the liquid, which will serve to avoid disintegration of the material. Then, UV radiation initiates solidification of skin of the resinous material. As the material travels upward with lessening pressure, curing reaction progresses with penetration into the core portion of the material. Therefore, the change in liquid pressure and progress in cure are well balanced in this process. In contrast, the FIG. 3 process must move the continuous resinous material in a direction transverse to the direction of gravity. Therefore, some skin cure of the material by UV radiation is desired to take place while the material is travelling inside the die or before being pulled out of the die, in order to avoid disintegration thereof. For this purpose, a modified die as described before is suitable, because such a die can receive UV radiation in its forward portion. Further, this process requires a liquid seal construction at two places; at the entry die and also at the exit nozzle.

It is to be noted here that a medium liquid will serve to apply pressure to a resinous material as noted before and further it will serve as a coolant to reactions taking place, which are often exothermic and wherein furious local exothermic trend should be avoided to prevent the finished rod surfaces from damage or having an impaired look, for which purpose the double port die will be effective, as will be illustrated later.

The continuous resinous material or FRP material thus cured, accordingly, which may be a prutruded rod or pole, will be normally wound around a roll. If the rod is so rigid as to be unsuitable for winding it will be cut into some convenient length. Such finishing jobs will be done with artisan knowledge.

EXAMPLE 1

In the FIG. 1 embodiment, pultrusion was conducted under the following experimental conditions:

Mold; a tube made of PTFE, a kind of fluorine resin, inner dia.=2 mm, outer dia.=4 mm, length=30 cm.

UV lamp; a high pressure UV lamp, air cooling, 80 w/cm, 1 kw, two lamps.

Coating material; ester acrylate (brandnamed ARONIX M6100 by TOA GOSEI CO.) 100 parts.

UV sensitizer; (benzildimethyl ketal, brandnamed IRGACURE 651 by CIBA-GEIGY) 2 parts.

Internal mold release; 2 parts.
Filamentary material; glass roving.
Pultrusion speed; 5 m/min.
Finished rod has superior quality.

EXAMPLE 2

In the FIG. 2 embodiment, pultrusion was conducted under the following conditions:

Mold; made of stainless steel, inner dia.=2.0 mm.

UV lamp; high pressure UV lamp, 80 w/cm, 1 kw, one lamp.

Coating material; ester acrylate (brandnamed ARONIX M6100 by TOA GOSEI CO.) 100 parts.

UV sensitizer; (benzildimethyl ketal, brandnamed IRGACURE 651 by CIBA-GEIGY) 4 parts.

Filamentary material; glass roving.
Medium liquid; water.
Pultrusion speed; 10 m/min.

Finished rod has superior quality, which is compared as below to a control experiment wherein the cure was conducted in the air.

|  | Product of Ex. 2 | Control |
| --- | --- | --- |
| Surface Finish: | improved | impaired |
| Surface Hardness: | over 80 | under 60 |
| Dia. of Finished Rod: | 1.92 ± 0.05 | 1.90 ± 0.1 |

Note
1. In the surface finish, "improved" indicates that there are no sticky remains and "impaired" indicates that there is some scarred or undercured remain.
2. The surface hardness is by Shore D.
3. Unit is mm. the fact that a smaller ± range is obtained with the inventive product indicates that the inventive pultrusion is superior in regenerating a given shape of a die or mold section.

EXAMPLE 3

In FIG. 2 embodiment, polyethylene (PE) roving was used as replacement for glass roving in the foregoing.

Coating material; ester acrylate (brandnamed ARONIX M6100 by TOA GOSEI CO.) 100 parts.

UV sensitizer; (benzildimethyl ketal, brandnamed IRGACURE 651 by CIBA-GEIGY) 4 parts.

Mold; stainless, circular section, dia.=1.5 mm.
Medium liquid; water.
Pultrusion speed; 5 m/min.
Finished rod has superior quality.

EXAMPLE 4

The double port die, of which tip portion is as shown in FIG. 4, was used to mold a skin/core structured rod. Such structure formation is useful to further improve a surface look of the finished rod.

Die: inner port; dia.=1.4 mm, outer port; dia.=1.5 mm.

Coating material:
for inner;
 ARONIX M6100—100 parts
 IRGACURE651—4 parts
for outer;
 ARONIX M1100—50 parts
 ARONIX M101—50 parts
 IRGACURE651—4 parts Pultrusion speed; 5 m/min.

Production of skin/core structured rod will dispense with an after-finish job of top coating on the pultruded rods.

INDUSTRIAL APPLICABILITY

The present invention will be applied to produce rod, pole, rope products, etc. When it comes to non-cut products, it may be a lengthy rope, which will be used as, for instance, a rope for exploring a deep sea bottom; a retainer rope or tension member for a bundle of data transmission fibers to be set for a long distance.

I claim:

1. A method of pultrusion comprising:
   (a) impregnating a continuous reinforcing material with a UV curable resin;
   (b) pulling the impregnated continuous reinforcing material through a pipe die having a cross-section corresponding to the cross-section of the product to be obtained; the die being made of a material capable of transmitting UV rays and which is provided on its inner surface with a silicone or fluorine compound capable of transmitting UV rays and which resists sticking with the UV curable resin; and
   (c) irradiating the impregnated continuous reinforcing material during its passage through the die with the UV rays to substantially cure the UV curable resin and form a product having the desired cross-section.

2. The method of pultrusion of claim 1, wherein the die is made of glass.

3. The method of pultrusion of claim 1, wherein the die has a circular cross-section.

4. The method of pultrusion of claim 1, wherein the die has a non-circular cross-section.

5. A method of pultrusion comprising
   (a) impregnating a continuous reinforcing material with a UV curable resin;
   (b) pulling the impregnated continuous reinforcing material through a die having a cross-section corresponding to the cross-section of the product to be obtained and shaping the impregnated continuous reinforcing material;
   (c) introducing the shaped impregnated continuous reinforcing material exiting from the die into a medium liquid which is capable of transmitting UV rays and immiscible with the UV curable resin; and
   (d) irradiating the shaped impregnated continuous reinforcing material in the liquid medium with UV rays to substantially cure the UV curable resin and form a product having the desired cross-section.

6. The method of pultrusion of claim 5, wherein the die is made of a UV absorptive material.

7. The method of pultrusion of claim 5, wherein the die is made of a material capable of transmitting UV rays and which is provided on its inner surface with a silicone or fluorine compound capable of transmitting UV rays and which resists sticking with the UV curable resin.

8. The method of pultrusion of claim 5, wherein the die comprises a first portion made of a UV absorptive material and, connected to the forward end thereof, a second portion made of a material capable of transmitting UV rays and which is provided on its inner surface with a silicone or fluorine compound capable of transmitting UV rays and which resists sticking with the UV curable resin.

9. The method of pultrusion of claim 5, wherein the pultrusion through the die is carried out in a vertical direction.

10. The method of pultrusion of claim 5, wherein the pultrusion through the die is carried out in a horizontal direction.

11. The method of pultrusion of claim 5, wherein the medium liquid is selected from the group consisting of water and silicone oil.

12. The method of pultrusion of claim 5, wherein the die is a double port die which forms a skin/core structure.

13. The method of pultrusion of claim 5, wherein the die has a circular cross-section.

14. The method of pultrusion of claim 5, wherein the die has a non-circular cross-section.

15. An apparatus for pultrusion comprising:
    (a) means for impregnating a continuous reinforcing material with a UV curable resin;
    (b) a pipe die downstream of the means (a) for receiving the continuous reinforcing material impregnated with a UV curable resin and for curing the resin, said pipe die having a cross section corresponding to the cross section of a product to be obtained and being made of a material capable of transmitting UV rays and provided on its inner surface with a silicone or fluorine compound capable of transmitting UV rays and resistant to sticking with the UV curable resin;
    (c) means for irradiating the pipe die with UV rays; and
    (d) means for pulling the impregnated continuous material through the pipe die.

16. A pultrusion apparatus comprising:
    (a) means for impregnating a continuous reinforcing material with a UV curable resin;
    (b) a pipe die downstream of said means (a) for receiving the impregnated continuous reinforcing material, said pipe die having a cross section corresponding to the cross section of the product to be obtained and being provided on its inner surface with a silicone or fluorine compound resistant to sticking with the UV curable resin and said die having a length insufficient to effect cure of the UV curable resin but sufficient to effect shaping of the impregnated continuous reinforcing material;
    (c) a liquid medium arranged downstream of the pipe die for forming a continuous passage for effecting cure of the UV curable resin of the impregnated continuous reinforcing material, said liquid medium being capable of transmitting UV rays and being immiscible with the UV curable resin;
    (d) means for irradiating the liquid medium with UV rays; and
    (e) means for pulling the impregnated continuous reinforcing material through the passage formed by the pipe die and liquid medium.

17. The apparatus of claim 15 wherein the die is made of glass.

18. The apparatus of claims 15 wherein the die has a circular cross-section.

19. The apparatus of claim 15 wherein the die has a non-circular cross-section.

20. The apparatus of claim 15 wherein the die is a double port die which forms a skin/core structure.

21. The apparatus of claim 16 wherein the die is made of glass.

22. The apparatus of claims 16 wherein the die has a circular cross-section.

23. The apparatus of claim 16 wherein the die has a non-circular cross-section.

24. The apparatus of claim 16 wherein the die is a double port die which forms a skin/core structure.

* * * * *

UNITED STATES PATENT AND TRADEMARK OFFICE
CERTIFICATE OF CORRECTION

PATENT NO. :  4,861,621

DATED :  August 29, 1989

INVENTOR(S) :  Takashi KANZAKI

It is certified that error appears in the above-identified patent and that said Letters Patent is hereby corrected as shown below:

On the cover page, Item [73] should read:

--Assignee:  Toyo Cloth Co., Ltd., Sennan; Toyo Boseki Kabushiki Kaisha, Osaka, both of Japan--.

Signed and Sealed this

Seventh Day of August, 1990

*Attest:*

HARRY F. MANBECK, JR.

*Attesting Officer*     *Commissioner of Patents and Trademarks*